United States Patent [19]
Wilkins et al.

[11] Patent Number: 5,925,240
[45] Date of Patent: Jul. 20, 1999

[54] WATER TREATMENT SYSTEM HAVING DOSING CONTROL

[75] Inventors: Frederick C. Wilkins, Pepperell; Li-Shiang Liang, Harvard, both of Mass.; Herbert Bendlin, Ransbach-Baumbach, Germany; Stephane Dupont, Elancourt, France; Achim Brust, Waldems Esch; Felix Nussbaum, Koblenz, both of Germany

[73] Assignee: United States Filter Corporation, Palm Desert, Calif.

[21] Appl. No.: 08/859,340

[22] Filed: May 20, 1997

[51] Int. Cl.⁶ .................................................. C02F 1/32
[52] U.S. Cl. .................. 210/88; 210/89; 210/110; 210/138; 210/143; 210/195.1; 210/195.2; 210/196; 210/202; 210/258; 210/266; 210/282; 210/287; 210/290
[58] Field of Search .................. 210/85, 87, 88, 210/89, 97, 109, 110, 137, 138, 143, 195.1, 195.2, 196, 258, 266, 287, 202, 282, 290

[56] References Cited

U.S. PATENT DOCUMENTS

| | | | |
|---|---|---|---|
| 526,695 | 10/1894 | Emery . | |
| 844,438 | 2/1907 | Bayley . | |
| 1,942,584 | 1/1934 | Weinstein | 210/132 |
| 2,391,716 | 12/1945 | Koupal | 210/130 |
| 2,752,309 | 6/1956 | Emmons et al. | 210/24 |
| 2,809,753 | 10/1957 | Atkinson | 210/301 |
| 3,155,612 | 11/1964 | Weber | 210/291 |
| 3,171,801 | 3/1965 | Rice et al. | 210/52 |
| 3,266,628 | 8/1966 | Price | 210/94 |
| 3,716,143 | 2/1973 | Calrk | 210/321 |
| 3,753,495 | 8/1973 | Bjork | 210/206 |
| 3,756,413 | 9/1973 | Gartner | 210/205 |
| 3,847,809 | 11/1974 | Kopf | 210/321 |
| 3,977,967 | 8/1976 | Trulson et al. | 210/23 |
| 4,033,874 | 7/1977 | Marquardt et al. | 210/189 |
| 4,088,563 | 5/1978 | Marquardt | 210/33 |
| 4,105,562 | 8/1978 | Kaplan et al. | 210/232 |
| 4,184,893 | 1/1980 | Halvorson et al. | 134/25 R |
| 4,191,648 | 3/1980 | Kaplan et al. | 210/186 |
| 4,192,750 | 3/1980 | Elfes et al. | 210/133 |
| 4,233,158 | 11/1980 | Wachsmuth | 210/283 |
| 4,257,395 | 3/1981 | Weider | 417/32 |
| 4,280,912 | 7/1981 | Berry, III et al. | 210/662 |
| 4,301,009 | 11/1981 | Cook et al. | 210/278 |
| 4,368,123 | 1/1983 | Stanley | 210/289 |
| 4,369,110 | 1/1983 | Picek | 210/180 |

(List continued on next page.)

FOREIGN PATENT DOCUMENTS

| | | |
|---|---|---|
| 982779 | 2/1976 | Canada . |
| 296 043 | 12/1988 | European Pat. Off. . |
| 61 004510 | 1/1986 | Japan . |
| 07 068257 | 3/1995 | Japan . |
| 928553 | 6/1963 | United Kingdom . |
| 97/01399 | 1/1997 | WIPO . |

OTHER PUBLICATIONS

PCT/US98/10568 International Search Report, dated Dec. 16, 1998.

Millipore Corporation (Bedford, MA) Milli–Q® Ultrapure Water Systems, "A New Generation of Advanced Ultrapure Water Systems for the Laboratory"—Advertisement.

*Primary Examiner*—Peter A. Hruskoci
*Attorney, Agent, or Firm*—Wolf, Greenfield & Sacks, P.C.

[57] ABSTRACT

A water treatment system having dosing control for providing treated water having very low organic and ionic contamination, that can be accurately dispensed. The water treatment system having dosing control includes a water inlet hydraulically connected to a pump having a variable speed motor. At least one water treatment device is hydraulically connected downstream of the pump, at least one outlet valve is hydraulically connected downstream of the water treatment unit, and a recirculation line is hydraulically connected from the outlet valve to the pump. The output of the pump is controlled by a regulating device connected to the variable speed motor. The system provides for lower electrical current usage and reduced acoustical disturbances.

39 Claims, 10 Drawing Sheets

U.S. PATENT DOCUMENTS

| | | | |
|---|---|---|---|
| 4,387,075 | 6/1983 | Morgart | 422/50 |
| 4,411,785 | 10/1983 | Yu et al. | 210/321.1 |
| 4,522,717 | 6/1985 | Brust | 210/238 |
| 4,568,464 | 2/1986 | Blaz et al. | 210/143 |
| 4,609,466 | 9/1986 | McCausland et al. | 210/244 |
| 4,615,800 | 10/1986 | Stifelman et al. | 210/132 |
| 4,624,625 | 11/1986 | Schrenker | 417/20 |
| 4,636,307 | 1/1987 | Inoue et al. | 210/188 |
| 4,647,375 | 3/1987 | Czeller et al. | 210/267 |
| 4,681,677 | 7/1987 | Kuh et al. | 210/88 |
| 4,684,460 | 8/1987 | Issautier | 210/90 |
| 4,783,272 | 11/1988 | Patterson | 210/196 |
| 4,786,420 | 11/1988 | Dalessandro | 210/791 |
| 4,818,398 | 4/1989 | Lott et al. | 210/238 |
| 4,826,594 | 5/1989 | Sedman | 210/266 |
| 4,838,856 | 6/1989 | Mulreany et al. | 604/65 |
| 4,894,154 | 1/1990 | Roz et al. | 210/266 |
| 4,969,991 | 11/1990 | Valadez | 210/143 |
| 5,128,035 | 7/1992 | Clark et al. | 210/251 |
| 5,160,429 | 11/1992 | Ohmi et al. | 210/137 |
| 5,227,071 | 7/1993 | Torline et al. | 210/651 |
| 5,378,370 | 1/1995 | Brane et al. | 210/678 |
| 5,397,468 | 3/1995 | Chomka et al. | 210/232 |
| 5,540,836 | 7/1996 | Covne | 210/221.2 |
| 5,571,310 | 11/1996 | Nanaji | 96/4 |
| 5,575,833 | 11/1996 | Griffin | 95/117 |
| 5,798,040 | 8/1998 | Liang | 210/232 |

WATER TREATMENT SYSTEM HAVING DOSING CONTROL

BACKGROUND OF THE INVENTION

1. Field of the Invention

The invention relates to a water treatment system and method and, more particularly, a water treatment system and method having improved dosing control for accurate distribution of treated water.

2. Description of the Related Art

High purity water is required for many applications including, for example, in chemical and biological analytical laboratories. Water for these applications is purified by a number of well-known techniques, including filtration, single or multiple distillation, sorption, and ion exchange. Water initially treated by distillation or reverse osmosis filtration is often further purified (polished) by passage through activated carbon beds to adsorb residual contaminants, principally organics. The pretreated water may also be treated by passage through layered or mixed beds of ion exchange resins to remove residual ionic impurities. Often, these water streams are also filtered through microporous filters to remove further residual contaminants prior to the system outlet.

When purified water is not required, conventional water treatment systems typically recirculate the water in a continuous or periodic operation through the various water treatment devices included in the system, for example UV lamps, ion exchangers and ultrafilters, to prevent the water quality from deteriorating while standing. Because of the high energy costs incurred during continuous operation of a recirculation pump or the like, and the associated high noise levels which can be disturbing to nearby workers, water treatment systems are often operated in a periodic mode of, for example, about 50 minutes standstill and 10 minutes of recirculation through the system. When purified water is required, therefore, it is sometimes necessary to circulate the water through the system for a period of time before the water can be used.

In addition, control of the purified water flow rate from the system is typically performed by adjusting an outlet valve. However, because the conventional system pump operates at a single high speed and output rate, to achieve the highest flow rate at the outlet valve, it can be difficult for users to dose small and/or accurate quantities of purified water from these systems.

SUMMARY OF THE INVENTION

Accordingly, the present invention is directed to a water treatment system having dosing control, wherein water can be treated such that it has very low organic and ionic contamination, and can be accurately dispensed from the system. The water treatment system having dosing control includes a water inlet hydraulically connected to a pump having a variable speed motor. At least one water treatment device is hydraulically connected downstream of the pump, at least one outlet valve is hydraulically connected downstream of the water treatment unit, and a recirculation line is hydraulically connected from the outlet valve to the pump. The output of the pump is controlled by a regulating device connected to the variable speed motor.

In another embodiment of the present invention, a water treatment system having dosing control includes a water inlet hydraulically connected to a pump. At least one water treatment device is hydraulically connected downstream of the pump, and at least one outlet valve is hydraulically connected downstream of the water treatment device, and a recirculation line is hydraulically connected from the outlet valve to the pump. A proportional valve is hydraulically connected downstream of said outlet valve, and the system output is controlled by a regulating device connected to the proportional valve.

In another aspect of the present invention, a method for treating water includes providing a water inlet hydraulically connected to a pump having a variable speed motor, and hydraulically connecting at least one water treatment device downstream of the pump, at least one outlet valve downstream of the water treatment unit, and a recirculation line from the outlet valve to the pump. A water stream is then directed to the water inlet, and it is pumped into the water treatment device to produce a purified water stream. When the outlet valve is closed the purified water stream is recirculated to the water inlet. When the outlet valve is opened the purified water can be removed by controlling the pump output with a regulating device connected to the variable speed motor.

In another aspect of the present invention, a filter cartridge assembly is provided with a ventilation system to remove entrapped air from the water treatment system. The cartridge assembly includes at least one filter cartridge having a housing with two ends. The housing typically includes a filter media. A first end cap is disposed on one end of the housing, which includes a fluid inlet port, a fluid outlet port, a first fluid distributor, and a vent device secured to the first end cap. A second end cap is disposed on a second end of the housing, and includes a product collection plenum, and a second fluid distributor that separates the filter media from the product collection plenum. Lastly, a liquid transfer tube is disposed within the housing, and extends from the product collection plenum to the fluid outlet port.

BRIEF DESCRIPTION OF THE DRAWINGS

It is to be understood that the following drawings are for the purpose of illustration only and are not intended as a definition of the limits of the invention. Objects and advantages of the present invention will become apparent with reference to the following detailed description when taken in conjunction with the following drawings, which disclose multiple embodiments of the invention, wherein the same reference numerals identify the same feature, in which.

DETAILED DESCRIPTION OF THE INVENTION

Figure 1:
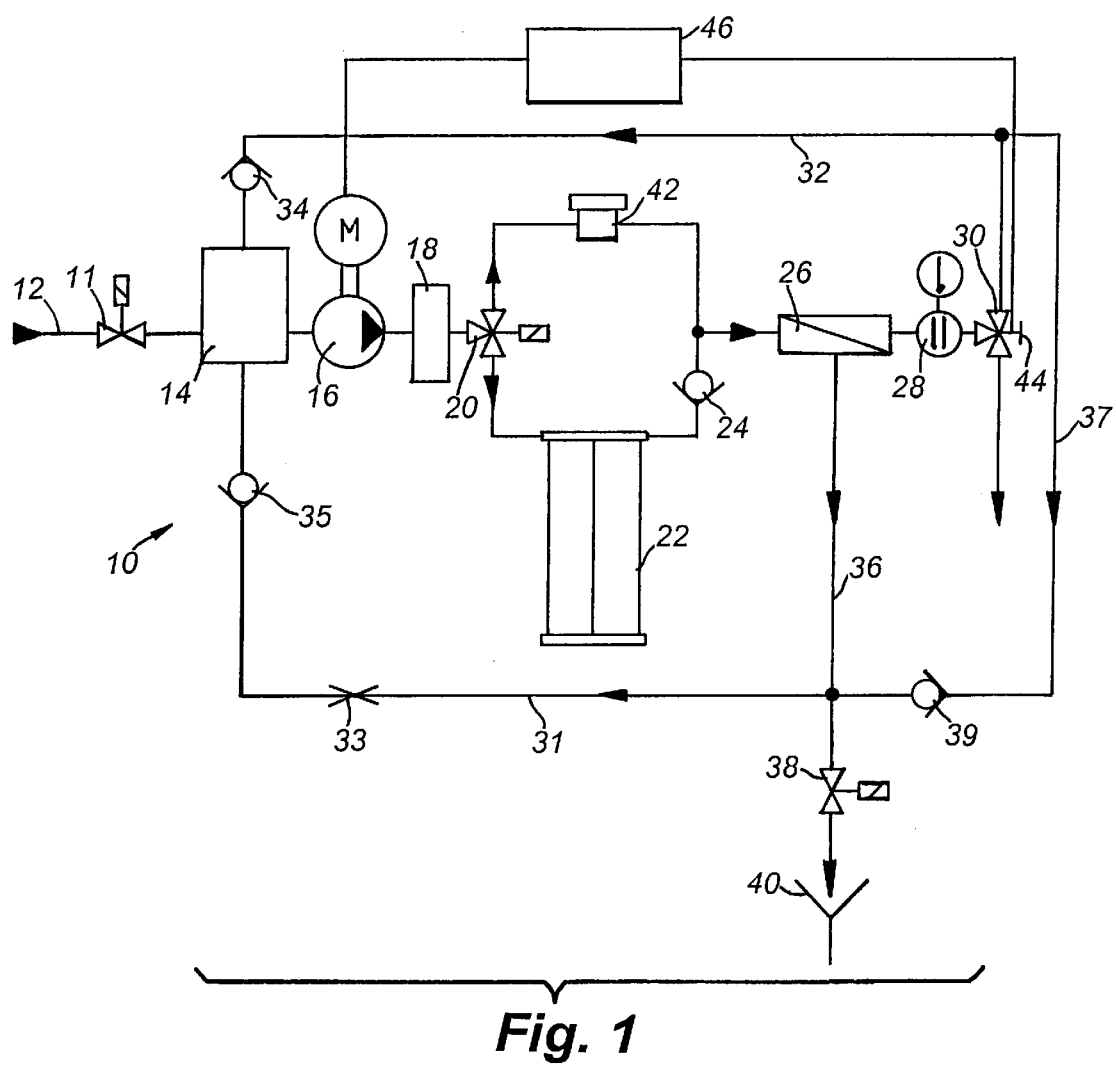
FIG. 1 is a schematic flow diagram of one embodiment of a water treatment system of the present invention.
Figure 2:
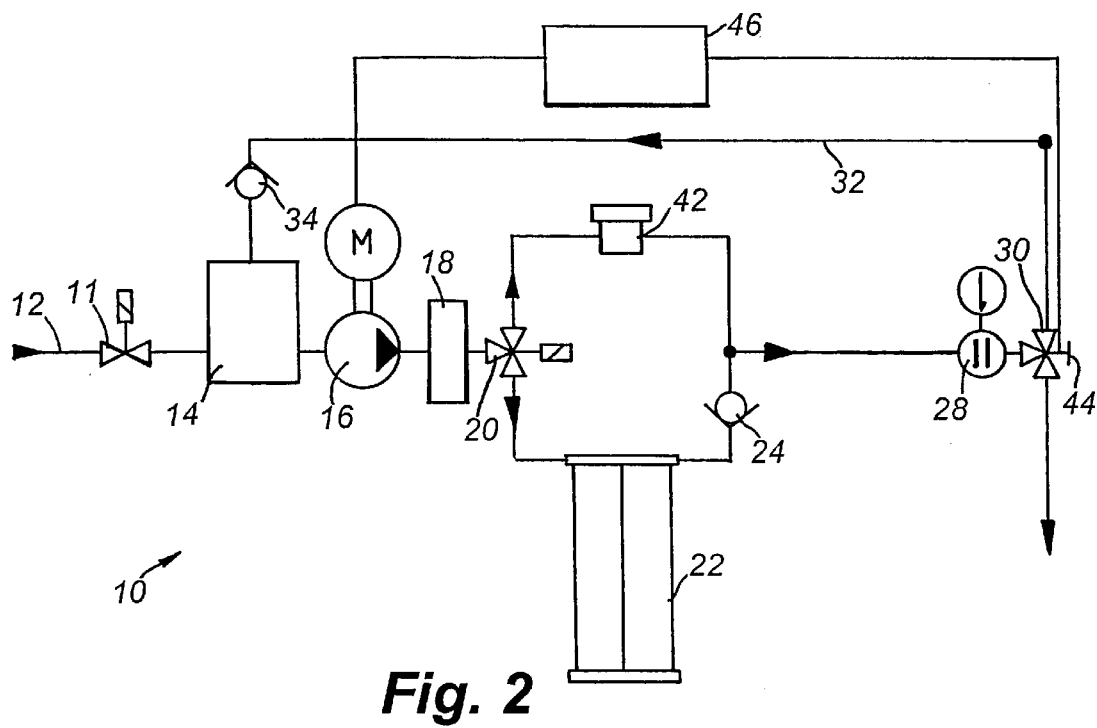
FIG. 2 is a schematic flow diagram of another embodiment of a water treatment system of the present invention.
Figure 3:
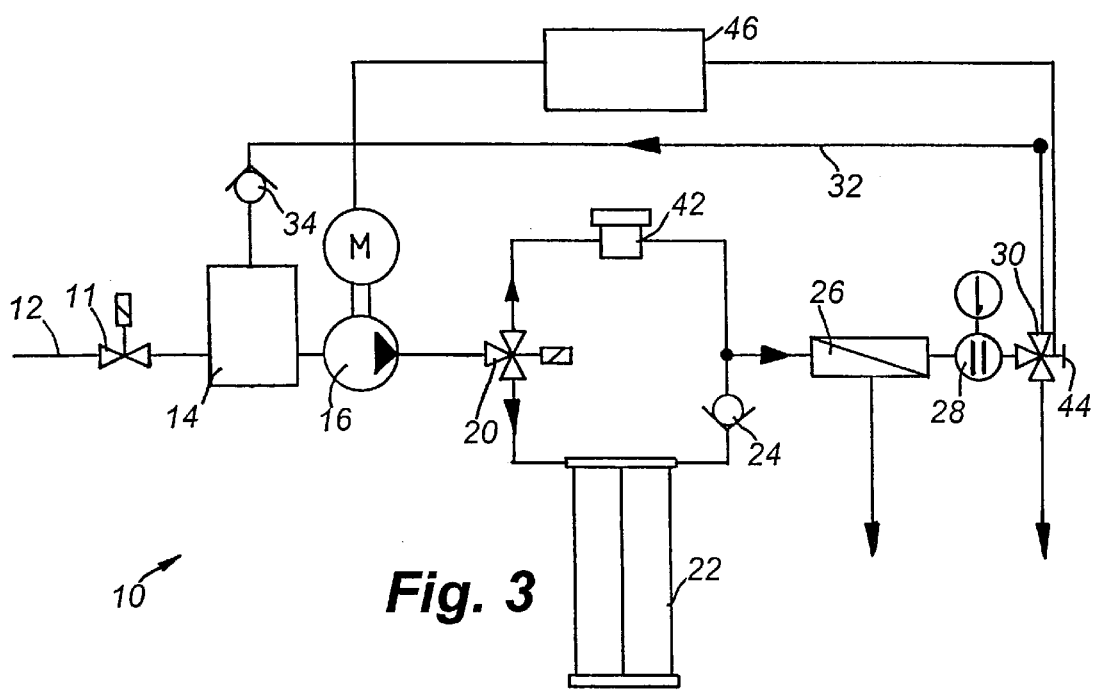
FIG. 3 is a schematic flow diagram of another embodiment of a water treatment system of the present invention.

The present invention is directed to a water treatment system having dosing control. As shown in FIG. 1, one embodiment of a water treatment system 10 having dosing control of the present invention includes a water inlet having an inlet valve 11, for example in the form of a solenoid valve, connected to an untreated or retreated water line 12. This line can be hydraulically connected to a storage tank 14 downstream from inlet valve 11, to which the aspirating side of a pump 16 having a variable speed motor M is connected. The pump 16 passes the untreated or retreated water to at least one water treatment device that is hydraulically connected downstream of the pump. For example, an ultraviolet (UV) lamp unit 18, a filter cartridge 22 having a plurality of series connected cartridges, for example, having at least one cartridge having at least one layer of an activated carbon and/or at least one layer of a mixture of ion exchange resins, and/or an ultrafilter (UF) unit 26, and combinations thereof can be used in the present system 10. Alternative embodiments of system 10 are shown in FIG. 2, wherein filter cartridge 22 is the only water treatment device; FIG. 3, wherein UV lamp unit 18 is connected upstream of filter cartridge 22; and FIG. 4, wherein UF unit 26 is connected downstream of filter cartridge 22. A disinfection unit 42 can also be hydraulically connected in system 10, positioned parallel with filter cartridge 22. A three-way valve 20 and a check valve 24 can be used to prevent disinfectant from unit 42 from entering filter cartridge 22. At the end of the system 10, at least one outlet valve 30, for example, in the form of a three-way solenoid valve, is hydraulically connected downstream of the water treatment units. A conductivity measuring cell 28, which typically includes an integrated temperature sensor, can also be used in the system to monitor the water quality.

Figure 4:
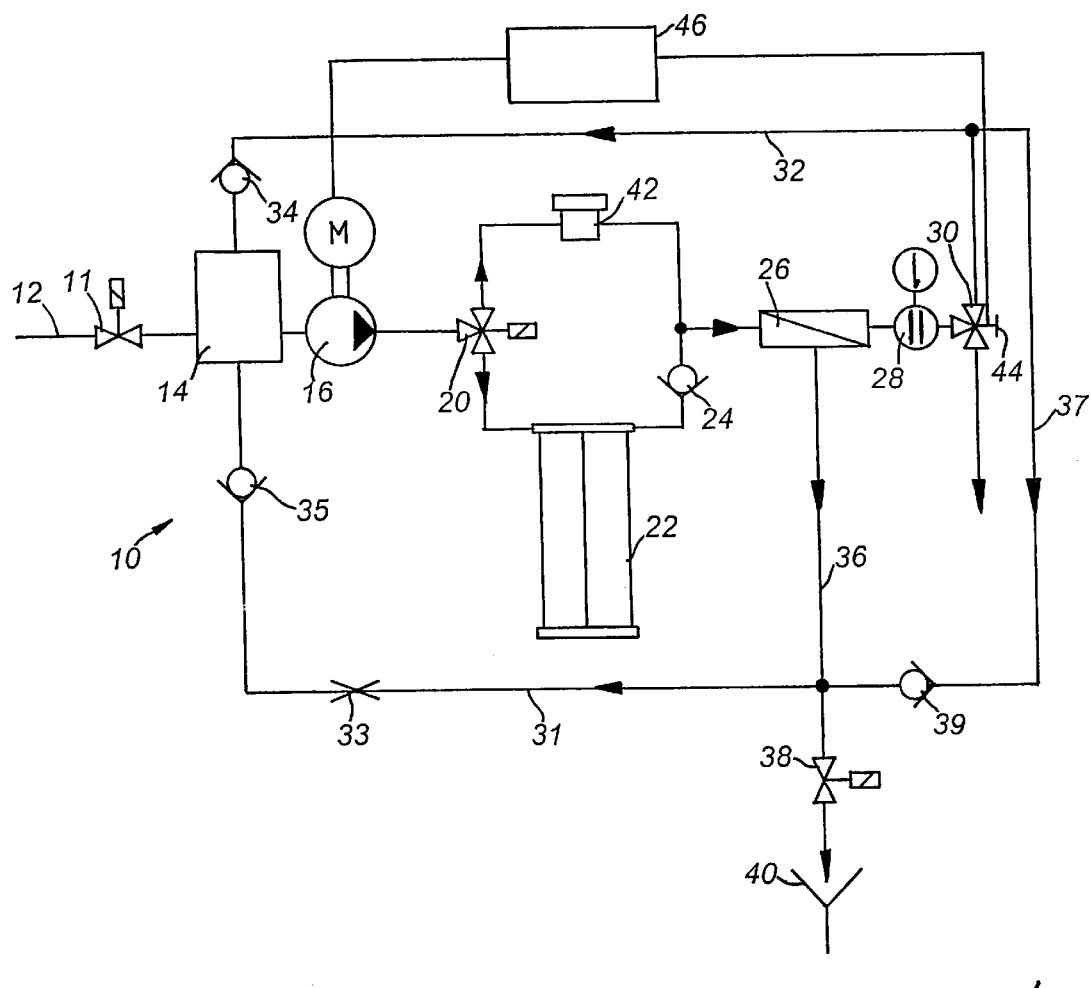
FIG. 4 is a schematic flow diagram of another embodiment of a water treatment system of the present invention.

A first recirculation line 32 is hydraulically connected from the outlet valve 30 to storage tank 14 through check valve 34, or directly to the aspirating side of pump 16. As shown in FIGS. 1 and 4, if UF unit 26 is used, the portion of the water which does not flow through unit 26 is directed to valve 38 at wastewater outlet 40, or it is directed to the aspirating side of pump 16 through outlet line 36 and a second recirculation line 31, having a throttle 33 and a check valve 35 upstream of solenoid valve 38. Recirculation line 32 is connected with outlet line 36 and circulation line 31 via connecting line 37 having a check valve 39.

As shown in FIGS. 1–4, system 10 further includes a regulating device including an input device 44, to allow a user to set a flow rate, and a controller 46 (most typically, a CPU with memory). The input device 44 is in the form of, for example, a potentiometer, a key pad, an angle encoder, and the like. These devices typically include a rotating handle or key pad that is used to provide an input signal, for example the angle of rotation position, to controller 46 that represents a desired flow rate of water at outlet valve 30. The controller 46 converts the input signal to a motor control signal that causes the motor M to operate at a speed which drives pump 16 and causes the flow of water at outlet valve 30 to correspond to the desired flow rate. It is noted that, although shown near outlet valve 30, input device 44 can be positioned at any location throughout system 10 that is easily accessible for a user dispensing water. In another embodiment of the invention, input device 44, for example a potentiometer, may directly send an input signal to motor M which causes the flow of water at the system outlet to correspond to the desired flow rate. Therefore, the output of pump 16 is controlled by the user making, for example, rotating movements of an input device 44. The motor control signal causes the speed of motor M to vary between zero and a predetermined maximum speed, at which the highest output of pump 16 can be reached. The pump 16 is preferably a magnetically coupled positive displacement gear pump that is driven by motor M. As noted above, motor M is preferably a variable speed motor, such as a 3-phase, brushless, electronically commutated direct current motor in a small power, low-voltage range, having an electronic drive, for example a VARIOTRONIC™ compact drive electronic assembly (available from Papst-Motoren GmbH & Co. KG, Germany).

In a further embodiment of the present invention, the regulating device can include a device that can function as a timer to turn off motor M at a first predetermined time, and/or turn on motor M at a second predetermined time. This operation would allow, for example, pump 16 to be preprogrammed to start up prior to normal hours of operation of water treatment system 10, and to shut down during extended periods of nonuse. Typically, a user would provide desired times of operation and shut down to the regulating device directly through an input device such as a key pad. In another aspect of the invention, the predetermined times, for example, for starting up and shutting down motor M, are provided directly by the regulating device as a function of operational data. In this embodiment, controller 46 of the regulating device is adaptable, and can be programmed to monitor usage characteristics and trends to predict use. For example, operational data, such as water volumes, flow rates, times and dates, and periods of operation can be gathered by controller 46 to draw inferences as to the motors operational schedule. It is possible, therefore, to run pump 16 at short time intervals or, preferably, continuously during standby mode with less noise, and lower operating cost, and provide high purity water that is readily available for use when outlet valve 30 is opened. When pump 16 is switched from the standby mode to a water dispensing mode by input device 44 of regulating device, the pump output rate can be adjusted in a stepwise manner or, preferably, essentially continuously up to a predetermined maximum output. This feature allows small quantities of water to be easily and accurately metered with a low pump output.

The control of the output of pump 16 by the regulating device allows for better control of the pump output in the recirculation (or standby) mode when outlet valve 30 is closed, and maintains the treated water quality during the standby mode by circulating the water through the units 18, 22 and 26 for water treatment at a comparatively slow rate. As is known, water treatment by a UV lamp unit is effective at a 185 nm wavelength to reduce the TOC to levels of about 5 ppb, as well as at 254 nm wavelength to reduce bacteria levels. Water treatment by a filter cartridge having a plurality of series connected cartridges, for example having at least one cartridge having at least one layer of an activated carbon, and at least one layer of a mixture of ion exchange resins, is known to be effective to adsorb residual organic contaminant materials as well as to remove residual ionic impurities. Water treatment by UF units is known to remove suspended small particles and pyrogens.

In a preferred embodiment of the present invention, outlet valve 30 can be switched between a completely closed and a completely open position. For example, outlet valve 30 can be a solenoid valve which, starting from the closed position, is switched into the opened position during the initial phase of the movement of input device 44. As noted above, however, the outflow rate of treated water from system 10 is determined by the output of pump 16 and not by the cross section of outlet valve 30.

In the preferred embodiment of the present invention, when outlet valve 30 is closed, pump 16 is operated in the standby mode, at least in time intervals, at a comparatively low output. When outlet valve 30 is open, pump 16 is operated with an output whose lowest value is less than, and whose greatest value is higher than, the output in the standby mode. In the water dispensing mode, the water in system 10 is initially brought to an approximate standstill, and can then be easily and accurately metered in small or large quantities by the user providing an input signal with input device 44. For example, in standby operation pump 16 can run at an output of about 0.5 liter/min; this output can be reduced or increased to about 1.5 liters/min when the system is dispensing water and outlet valve 30 is opened. When the system is returned to standby mode, by the input signal provided by the user, the controller 46 provides a motor control signal that causes the motor M to initially stop and then operate at a speed which causes pump 16 to recirculate water through the system.

As noted above, system 10 can include an inlet valve 11, for example a solenoid valve, that is either directly connected to an untreated public water supply system, or a retreated (for example, by reverse osmosis) water line 12. System 10 can also include storage tank 14, positioned between inlet valve 11 and pump 16, into which recirculation line 32 is hydraulically connected. If used, inlet valve 11 is opened simultaneously with outlet valve 30. Alternatively, inlet valve 11 can be used to control the liquid level of storage tank 14.

In another aspect of the invention, disinfecting unit 42 through which at least one disinfectant can be introduced into the water flowing through system 10, is hydraulically connected between pump 16 and outlet valve 30. Disinfecting unit 42 can be used to disinfect water-contacting elements of system 10. As shown in FIGS. 1–4, certain water treatment units, for example filter cartridge 22 including at least one layer of a mixture of ion exchange resins, can be isolated from the system, by operation of valve 20 and check valve 24, prior to the start of a disinfecting process. As is known to those skilled in the art, disinfectants typically include oxidants which can adversely affect cation and anion exchange resins, resulting in a loss of the ion exchange resins capacity.

Figure 5:
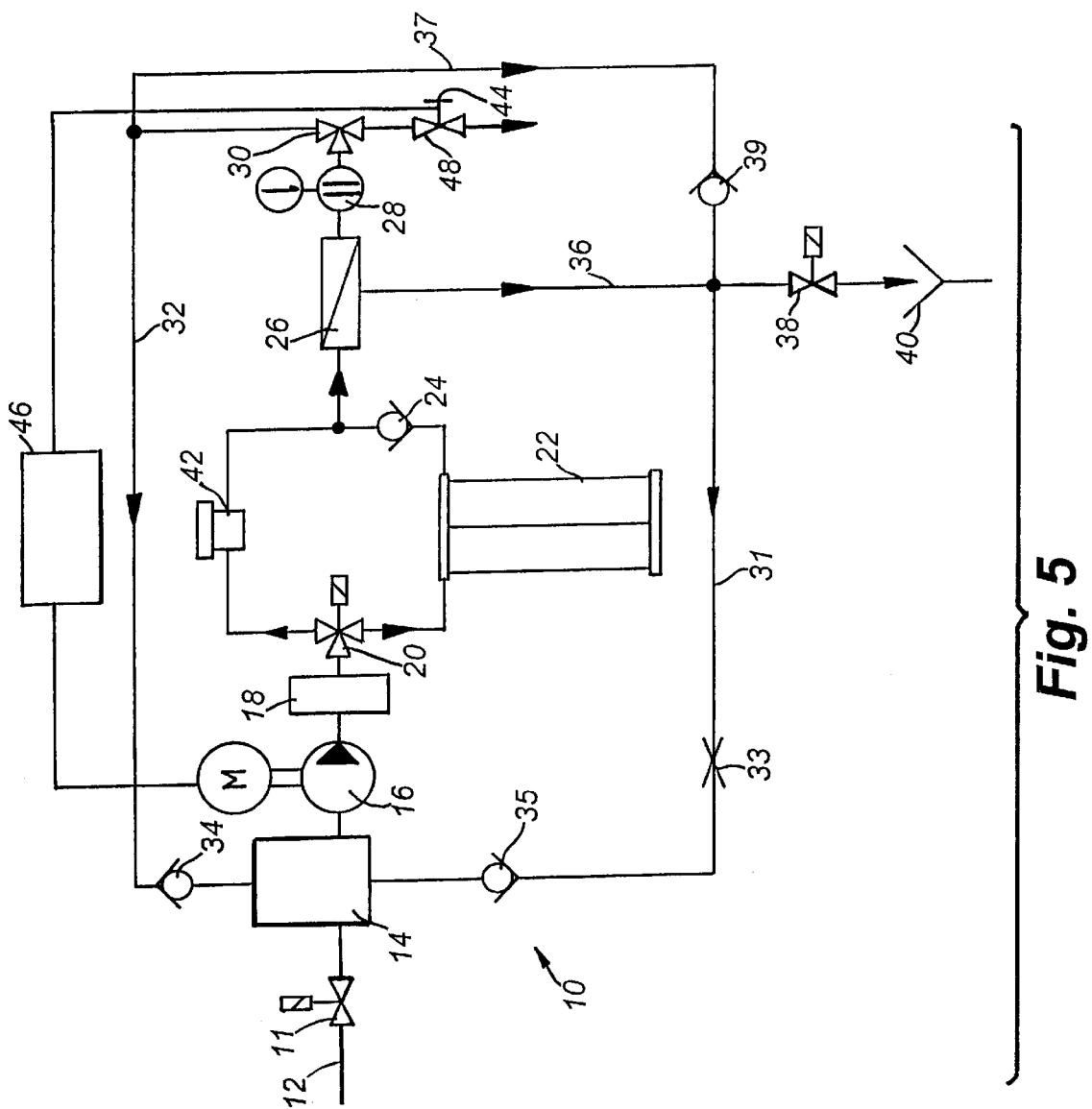
FIG. 5 is a schematic flow diagram of another embodiment of a water treatment system of the present invention.

An alternative embodiment of the water treatment system of the present invention is shown in FIG. 5. This system is similar to that shown in FIG. 1 and described above. As shown, an input device 44, which can be in the form of, for example, a potentiometer, a keypad, an angle encoder, and the like, is used to provide an input signal to controller 46 that represents a desired flow rate of water. The controller 46 converts the input signal from input device 44 to a valve control signal, which controls the outflow cross-section of valve 48 and causes the flow of water at the valve to correspond to the desired flow rate. As noted above, although shown near valve 48, input device 44 can be positioned in any location throughout the system that is easily accessible for a user dispensing water. The valve control signal causes the valve 48 cross-section to vary between 0 and a predetermined maximum opening, at which the highest output of the system can be achieved. Valve 48 is preferably a proportional valve which opens proportionally in response to a particular applied voltage. Preferably, the valve's internal structure is lined with an inert plastic material to prevent water contamination at the system outlet. Such proportional valves are commercially available, for example, from South Bend Controls, Inc. (South Bend, Ind.); or Skinner Valve, Honeywell, Inc. (New Britain, Conn.). The output of system 10, therefore, can be controlled by the user making, for example, rotating movements of an input device 44 to control outflow cross-section of valve 48 and/or the speed of motor M.

Figure 6:
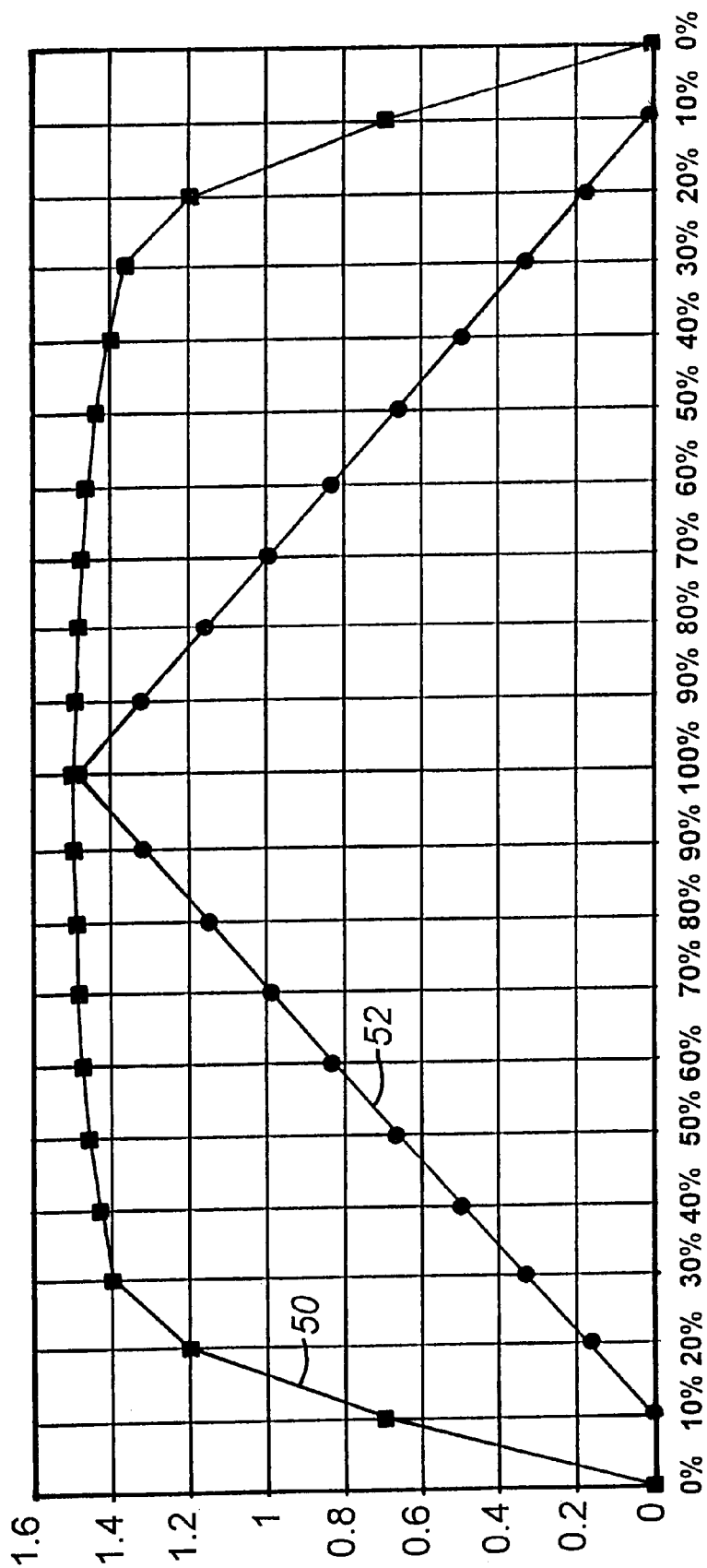
FIG. 6 is a graphic representation of the outflow rates of a conventional system and that of the present invention, with increasing opening and closing movements of a regulating device.

As an example of the improved dosing control of the present system, FIG. 6 graphically illustrates the outflow rates of a conventional system and that of the present invention. As shown, line 50 is a curve of the outflow rate of a conventional system over the opening and closing angle of the outlet valve. Line 52 represents the outflow rate of the present system as a function of the angle of rotation position of input device 44. As shown, line 50 indicates that a circulating pump is operated continuously, or at intervals, to achieve a maximum outflow rate when the outlet valve is completely opened. Thus, a high water pressure is initially present at the outlet valve, as shown by the steep rise of line 50, which indicates that small amounts of water can be difficult to easily and accurately meter.

The outflow rates of the present system, however, can be controlled, as represented by line 52. Increasing movement of input device 44 corresponds to a proportional rise of the outflow rate. Moreover, it is noted that it is also possible in the present system to select and program the shape of the line 52, for example as a sine curve with an initially flat and subsequently steeper rise, in controller 46. As shown, the outflow rate begins to rise only after an angle of rotation of input device 44 of about 10% of the entire opening angle. As noted above, the initial output of pump 16 is lowered to zero from the level of the standby mode, outlet valve 30 is then completely opened, and the output of pump 16 is subsequently increased during further adjustment of input device 44.

It has been found in the present system that, during the periods when the output of pump 16 is adjusted from the standby mode to the water dispensing mode, it is sometimes not possible to completely ventilate the system. As the pump is started up, air may get pulled into the system resulting in air bubbles in the system lines and water treatment units. To address this possibility, another aspect of the present invention includes incorporating a ventilation system on filter cartridge assembly 22.

As noted above, the filter cartridge assembly 22 can include a plurality of series connected cartridges. Each of the cartridges typically include an outer housing, a top end cap, a bottom end cap, and a central return tube. The top and bottom end caps are secured to opposite ends of the housing, while the return tube extends between, and is connected to, the top and bottom end caps. The housing is typically filled with filtering media, which includes, for example, at least one layer of an activated carbon and/or at least one layer of a mixture of ion exchange resins, which is placed around the return tube and is retained within the housing by the top and bottom end caps. Water to be treated enters the filter cartridge through an inlet port and an inlet plenum located in the top end cap. The water is then directed into the housing through an upper flow distributor in the top end cap which uniformly distributes the water into the filter media. The water permeates down through the filtering media to the bottom of the housing where it passes through a lower flow distributor and collects in a product collection plenum in the bottom end cap. The water is then directed upwardly from the product collection plenum through the return tube into the top end cap from which the purified water is discharged through an outlet port. The construction and fluid flow scheme of a filter cartridge that can be used in the present invention is more specifically described in pending U.S. patent application Ser. No. 08/598,818, entitled "WATER PURIFICATION CARTRIDGE ASSEMBLY WITH UNI-DIRECTIONAL FLOW THROUGH FILTER MEDIA," filed Feb. 9, 1996 now U.S. Pat. No. 5,798,040, and such disclosure is incorporated herein by reference. Moreover, it is noted that the individual filter cartridges can be hydraulically connected in series by coupling the outlet port of a first cartridge to an inlet port of a second cartridge, wherein the water flows through each cartridge as described above. The filter cartridges can be connected with additional mechanical devices, for example filter clips, to provide further stability. For example, the connection between filter cartridge units is more specifically described in pending U.S. patent application Ser. No. 08/599,259, entitled "MODULAR FILTERING SYSTEM AND METHOD OF ASSEMBLY," filed Feb. 9, 1996, and such disclosure is incorporated herein by reference.

Figure 7:
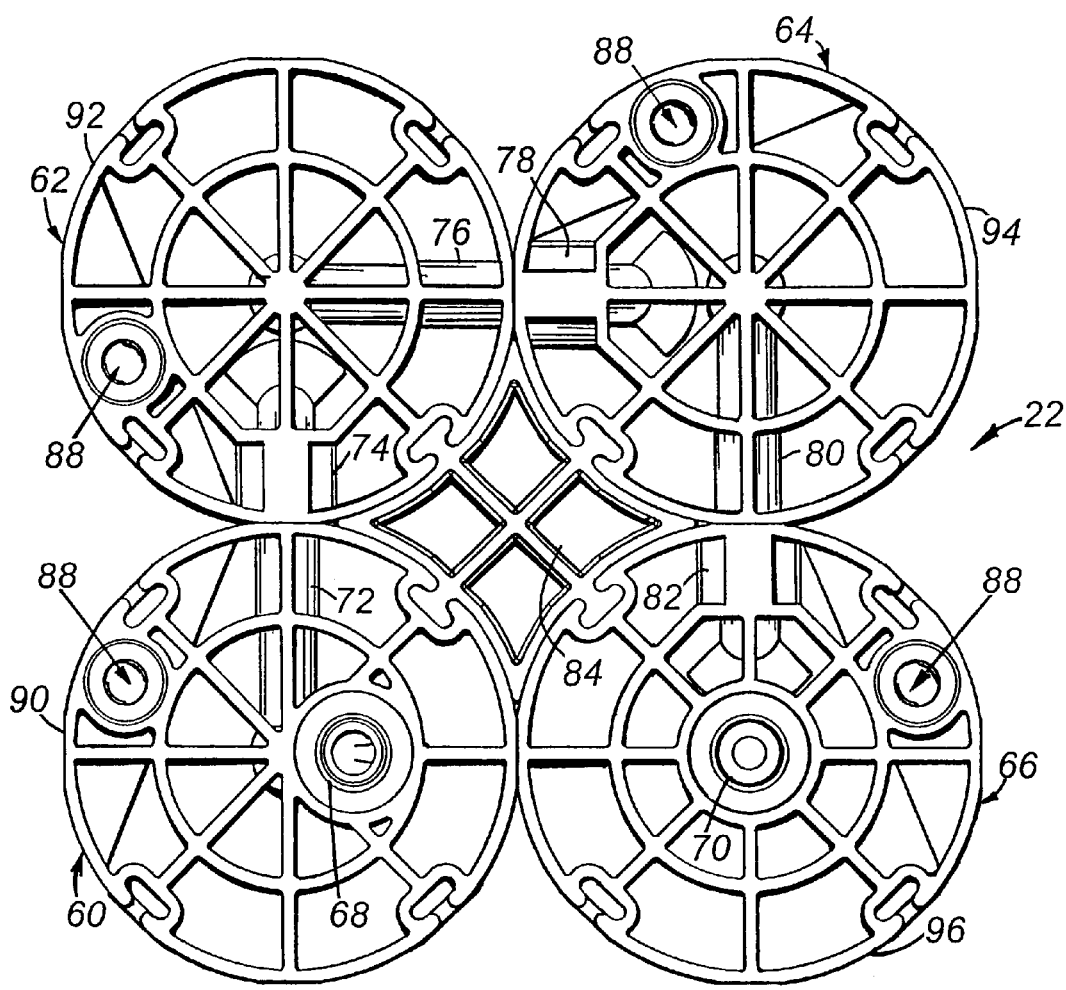
FIG. 7 is a top plan view of an illustrative embodiment of four filter cartridges arranged in a U-shaped configuration.
Figure 8:
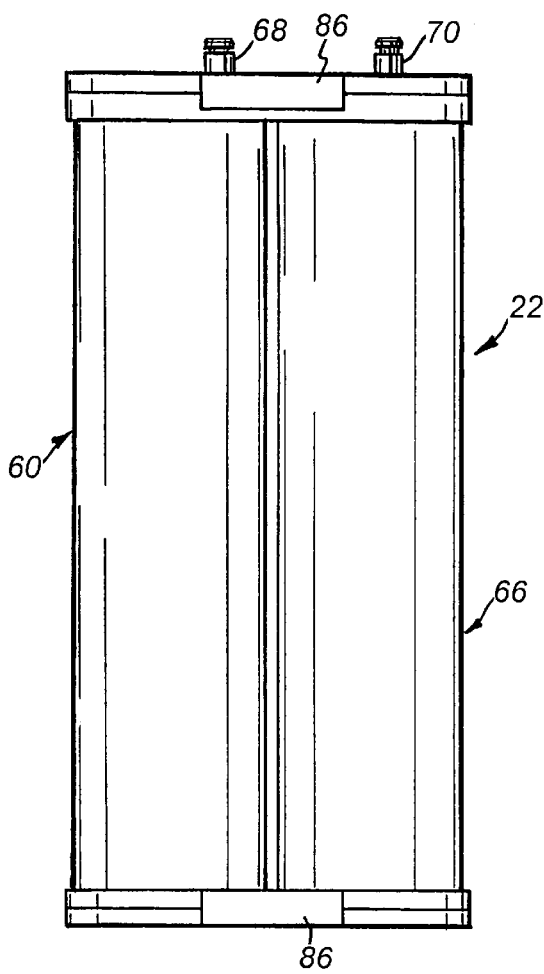
FIG. 8 is a side elevational view of the filter cartridge assembly shown in FIG. 7.

As noted, the filter cartridge assembly 22 of the present system incorporates a ventilation system to allow entrapped air to readily leave the system to the atmosphere. One embodiment of the filter assembly 22 utilizing a combination of individual filter cartridges is shown in FIGS. 7 and 8. The filter assembly 22 includes four filter cartridges hydraulically connected in series to achieve a flow through each filter cartridge as described above. In particular, the filter cartridge assembly 22 includes a first filter cartridge 60, a second filter cartridge 62, a third filter cartridge 64 and a fourth filter cartridge 66. Each of the filter cartridges is hydraulically connected to another of the filter cartridges such that fluid which enters the filter cartridge assembly through inlet port 68 subsequently flows through each cartridge as described above and is discharged from the outlet port 70 of the fourth filter cartridge 66. The inlet and outlet ports, 68, 70 are positioned on the top of the filter cartridge assembly 22 so that the assembly can be easily mounted in a console (not shown) housing system 10.

As further shown in FIG. 7, the top end caps of each filter cartridge are hydraulically connected to establish a flow circuit. Water to be treated enters the first filter cartridge 60 through inlet port 68. The water is discharged from the first filter cartridge 60 through its outlet port 72 which is hydraulically connected to the inlet port 74 of the second filter cartridge 62. The water then flows through the second filter cartridge 62 and is discharged through its outlet port 76 which is hydraulically connected to the inlet port 78 of the third filter cartridge 64. The outlet port 80 of the third filter cartridge 64 is hydraulically connected to the inlet port 82 of the fourth filter cartridge 66 so that water discharged from the third filter cartridge 64 enters the fourth filter cartridge 66, and the water is subsequently discharged from the filter cartridge assembly 22 through the outlet port 70 of the fourth cartridge 66. As shown, the configuration of the filter cartridge assembly 22 shown in FIG. 7 is achieved using top end caps having various configurations of inlet and outlet ports which can be selectively attached to filter cartridges to achieve a desired arrangement. Also, as shown in FIG. 7, the individual filter cartridges are mechanically secured to each other using a center clip 84 and side clips 86 (as shown in FIG. 8). FIG. 8 is a side elevational view of the filter cartridge assembly shown in FIG. 7.

Figure 9:
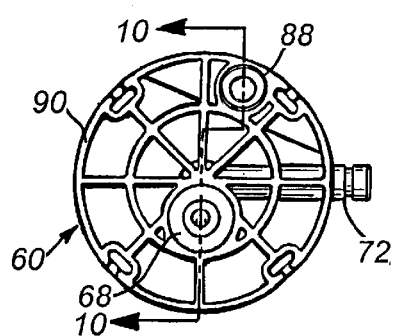
FIG. 9 is a top plan view of an illustrative embodiment of a top end cap of one filter cartridge.
Figure 10:
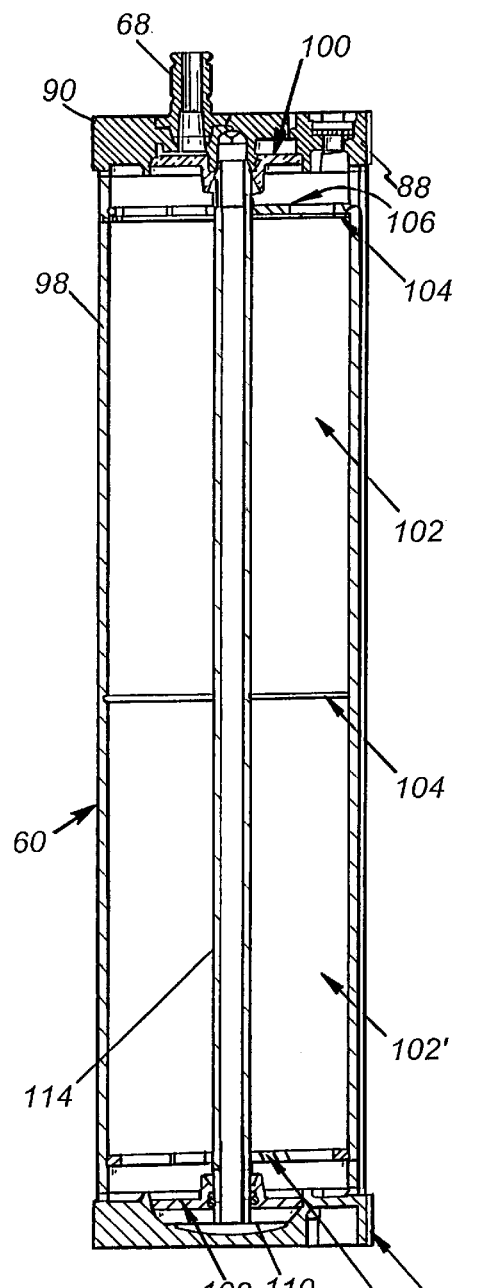
FIG. 10 is a cross-sectional side view, taken along section line 10—10, of the filter cartridge shown in FIG. 9.

Referring again to FIG. 7, the ventilation system of the present invention includes the incorporation of an individual vent device 88 positioned on the filter cartridge top caps to allow entrapped air in the system and, more particularly, in filter cartridge assembly 22 to escape, while preventing water or filter media to leave a filter cartridge. Preferably, vents 88 also prevent air from entering the filter cartridge. As shown in FIG. 7, vent 88 is positioned on filter cartridge top caps 90, 92, 94 and 96. A preferred embodiment of vent 88 is shown on top cap 90 that is secured to filter cartridge 60 in FIGS. 9–12. FIG. 10 illustrates a side elevational cross-sectional view, taken along section line 10—10 of FIG. 9 through vent 88 and filter cartridge 60. As shown in FIG. 10, the water enters filter cartridge 60 through inlet port 68 in top end cap 90. The fluid is directed into housing 98 through an upper flow distributor 100 in the top end cap 90 which uniformly distributes the water into the housing. The fluid permeates down through a screen 104 having a spider ring 106 into the filtering media. The media, for example, may consist of at least one layer of an activated carbon 102 and at least one layer of a mixture of ion exchange resins 102', which are separated by a media separation screen 104. The fluid permeates down through the filter media to the bottom of housing 98 where it passes through screen and spider ring 106 and a lower flow distributor 108 and collects in a product collection plenum 110 in the bottom end cap 112. The fluid is then directed upwardly from the plenum 110 through a return tube 114 into the top cap 90 from which the fluid is discharged through an outlet port.

Figure 11:
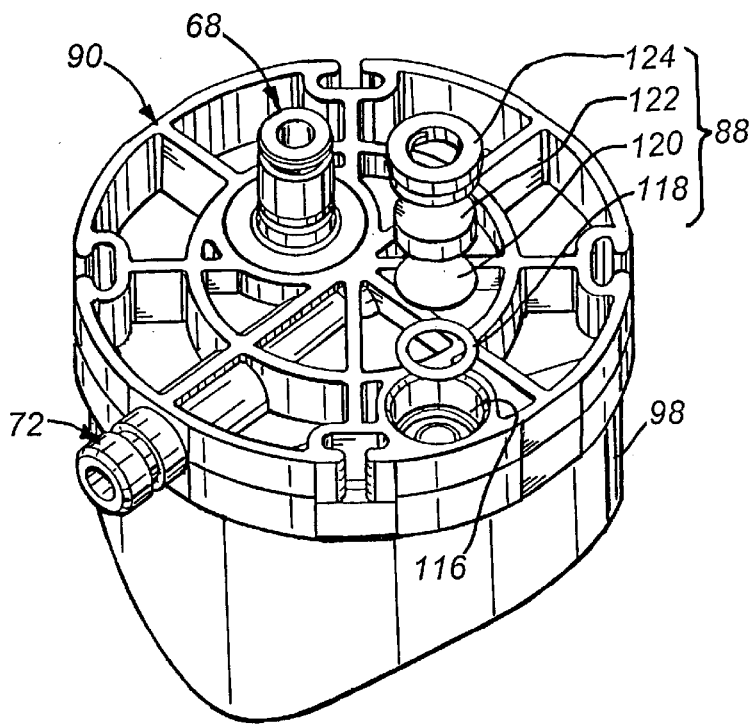
FIG. 11 is an exploded assembly view of an illustrative embodiment of a top end cap and a filter cartridge vent system of the filter cartridge shown in FIG. 9.
Figure 12:
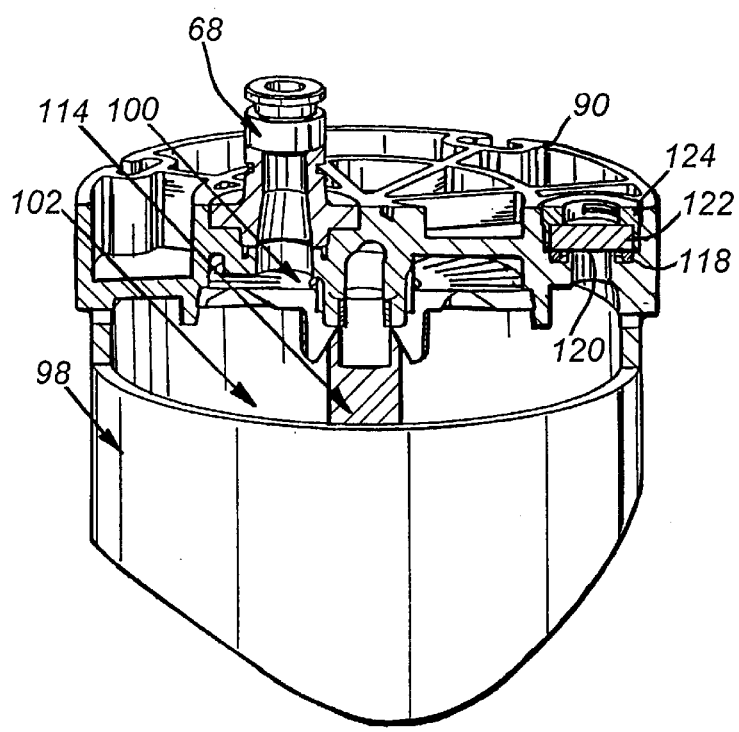
FIG. 12 is a partial section view of an illustrative embodiment of a top end cap and the filter cartridge vent system of the filter cartridge shown in FIG. 9.

An exploded assembly view of the filter cartridge vent device 88, and a cutaway section view of the vent device assembled in top cap 90, are respectively shown in FIGS. 11 and 12. As shown, a preferred embodiment of vent 88 is positioned in a channel 116 formed in top cap 90. The vent components include, for example, an O-ring seal 118, a porous membrane 120, a porous support disc 122 and a compression ring 124. FIG. 12 shows the vent components installed in top cap 90 to provide a means for entrapped air in the filter cartridge to escape to the atmosphere.

In a preferred embodiment of this aspect of the present invention, the porous membrane 120 is made of a hydrophobic material to allow air to pass through and prevent water from escaping the filter cartridge. The porosity of the membrane can vary, and is typically between 0.02 micron and 0.2 micron to prevent a water intrusion condition. As noted, the membrane is preferably made of a hydrophobic material such as polypropylene, TEFLON® resin, and the like. In an operative embodiment of the present invention, membrane 120 is made from GOR-TEX® expanded polytetrafluoroethylene having a 0.02 micron pore size (available from W. L. Gore & Associates, Inc., Elkton, Md,). The porous disc support membrane 122 is also preferably constructed from a hydrophobic material, such as a porous polypropylene material, and has a porosity of between about 50 and about 350 microns. In an operative embodiment of the present invention, the porous support disc is constructed from POREX® polypropylene material, having an average pore size of between about 125 and 350 microns (available from Porex Technologies, Fairburn, Ga.). O-ring seal 118 provides vent device 88 with a secure fit and seal into channel 116 of top cap 90 to prevent passage of materials other than entrapped air from escaping through the vent. Lastly, compression ring 124 is constructed of a material that is compatible with the top cap 90, and can be secured to top cap, as shown in FIG. 12 by, for example, ultrasonic welding, to rigidly secure vent components in the cap.

Figure 13:
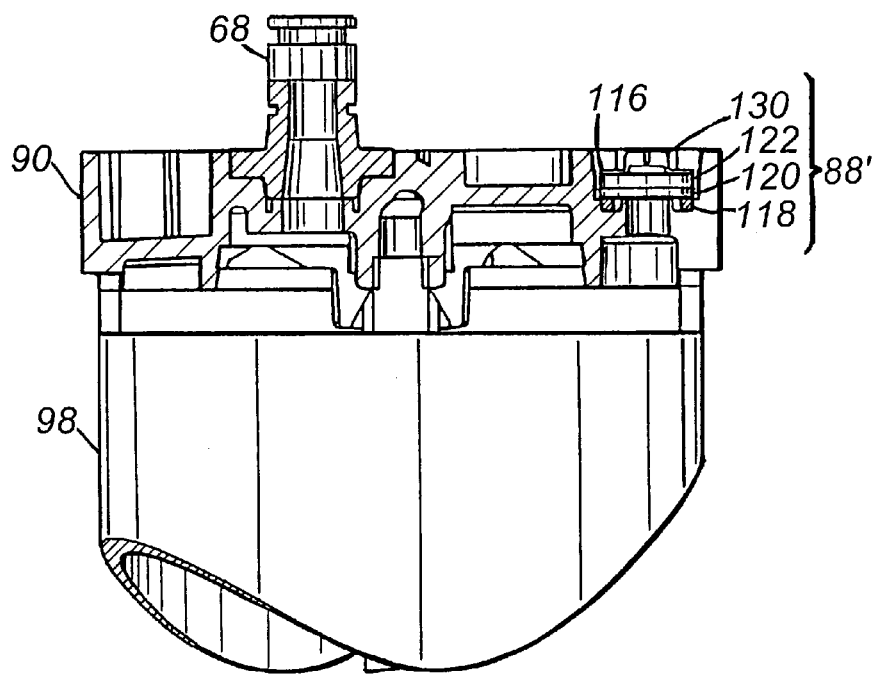
FIG. 13 is a partial section view of an illustrative embodiment of a top end cap and an alternative filter cartridge vent system.
Figure 14:
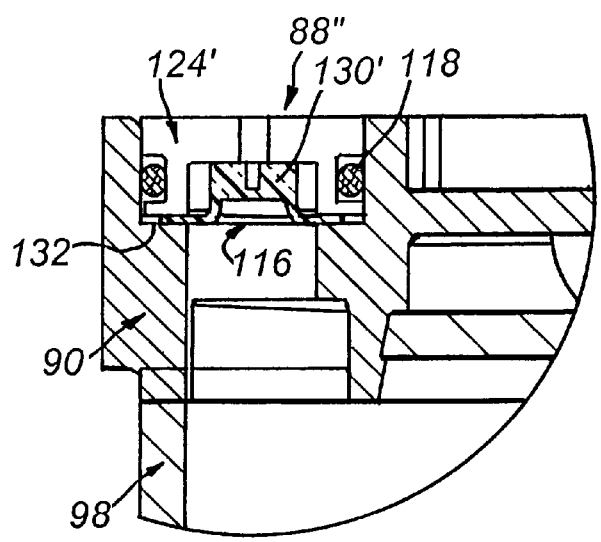
FIG. 14 is a section view of an alternative embodiment of a filter cartridge vent system positioned in a filter cartridge top end cap.
Figure 15:
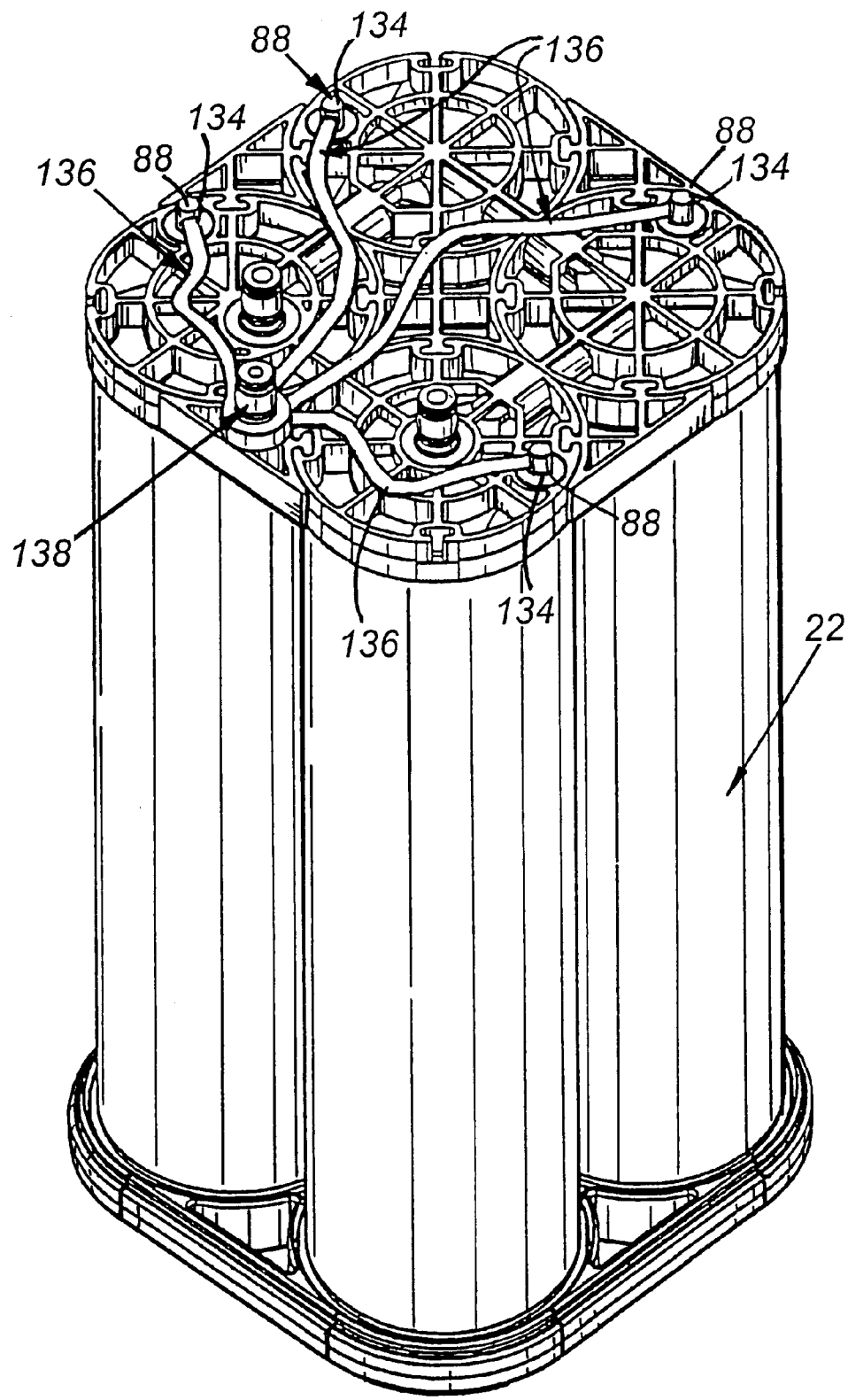
FIG. 15 is a schematic view of a filter cartridge assembly having an alternative filter cartridge vent system.

Alternative embodiments of the ventilation system of the present invention, as well as alternative arrangements of the individual vent device positioned on the filter cartridge top caps are shown in FIGS. 13, 14 and 15. As shown in FIG. 13, an alternative embodiment of vent 88' is positioned in channel 116 formed in top cap 90. Top cap 90 is sealed to housing 98 as described above, and further includes port 68. The alternative vent components are similar to those shown in the embodiment of FIG. 12, and include, for example, O-ring seal 118, porous hydrophobic membrane 120, and porous support disk 122. This alternative embodiment further includes a one-way valve 130, which also functions as a compression ring that seals the vent components in the top cap channel 116. The one-way valve 130 allows air to exit, but prevents air from entering, the filter cartridge. The hydrophobic membranes prevent water and/or filter media from escaping the filter cartridge.

FIG. 14 shows another embodiment of the ventilation system of the present invention, wherein a vent device 88" is assembled in top cap 90 which is secured to housing 98. Vent 88" includes, for example, O-ring seal 118, retaining ring 124', and one-way valve 130' having a flat gasket portion 132 which provides a seal for the vent device within the channel. The retaining ring 124' is constructed of a material that is compatible with top cap 90 such that the ring can be secured to the top cap, for example, by ultrasonic welding to secure the vent components in the channel 116. The one-way valve 130' allows for the passage of air from the filter cartridge at a predetermined pressure while preventing air from entering the cartridge.

Another alternative embodiment of the ventilation system of the present invention is shown in FIG. 15, wherein cartridge assembly 22, includes a plurality of series-connected cartridges and each of the cartridges includes a vent device 88 positioned on each filter cartridge top cap to allow entrapped air in the system to escape and prevent air from entering, while preventing water or filter media from leaving the filter cartridge. A similar arrangement of filter cartridges having individual vent devices is shown in FIG. 7. The alternative embodiment of the ventilation system shown in FIG. 15 includes vent connectors 134 which are attached to vent devices 88. The vent connectors are then each connected via conduits 136 to a solenoid connector 138, which is connected to a valve (not shown) which opens periodically to release entrapped air from the filter cartridge assembly.

The present invention will be further illustrated by the following Example, which is intended to be illustrative in nature and is not to be construed as limiting the scope of the invention.

EXAMPLE

A water treatment system having dosing control was evaluated to determine the effectiveness of the system in providing pure water, substantially free of contaminants, which can be accurately dosed at the system outlet when desired, or recirculated throughout the system at lower motor speeds and lower noise levels.

Pretreated water (by reverse osmosis) having a conductivity of about 2.0 $\mu$S/cm was introduced to the system through a on/off solenoid valve (lined with an inert material) at a flow rate of about 1.5 liters per minute. The feed water was then introduced to a magnetically coupled positive displacement gear pump (available from Tuthill, Inc.) to pressurize the water up to about 4 bars. The pump was driven by a VARIOTRONIC™ variable speed motor and motor controller. The pump then passed the water through a series of water treatment devices. The first device was a 185 nm one-pass UV lamp unit (available from Ideal Horizons, Inc., Poultney, Vt.). The UV lamp unit was used to oxidize organic contaminants present in the water. The water was then fed to a second device, which was a filter cartridge assembly (available from United States Filter Corporation, Lowell, Mass.) that included four individual filter cartridges hydraulically connected in series, and contained at least one layer of an activated carbon and/or at least one layer of a mixture of ion exchange resins. The filter cartridge assembly was used to remove residual organic and ionic impurities. After passage through the filter cartridge assembly, the water was then passed through an electrical resistivity sensor which measured the resistivity of the water to be about 18.3 megohm-cm (0.054 $\mu$S/cm). The water was then passed through a 10,000 molecular weight cutoff polysulfone hollow fiber membrane ultrafilter, wherein at least about 90 percent of the water passed through, while the reject stream was recycled to the pump inlet. Lastly, a 0.22 $\mu$m membrane final filter made from a cellulose nitrate membrane (available from Gelman Sciences, Ann Arbor, Mich.), was used to remove any remaining microorganisms and/or particles in the water.

The output of the motor, which drives the pump was controlled by an input device in the form of a potentiometer having a rotating handle that can be adjusted up to 300°. The potentiometer provided an input signal, which represents a desired flow rate of water at the outlet of the system, to a microprocessor. The microprocessor converted the input signal from the potentiometer to a motor control signal, which was sent to the VARIOTRONIC™ motor controller which caused the VARIOTRONIC™ motor to operate at a speed which caused the pump to pass the water through the system to the outlet valve at the desired flow rate. This flow rate was adjustable between a range of 0 to about 1.5 liters per minute at increments as small as a few drops of water to allow for accurate do sing of purified water. When water was not desired at the system outlet, the pump was operated in a recirculation mode, and the water was recirculated at a flow rate of about 0.5 liters per minute through the system to maintain the high level of water purity.

The system was also provided with a sanitization cycle. The sanitization cycle was intended to be used to maintain a low microorganism population within the system despite the fact that the system components (the conduits, valves, and connectors) were made from inert materials in terms of extractables or leachables. The sanitization cycle was started by introducing a chlorine sanitization tablet (available from United States Filter Corporation, Lowell, Mass.), typically made from a chemical oxidant such as chloroisocyanuric acid, or the like, into a sanitization chamber which was then dissolved in the flow stream of water. The chemical oxidant then passed through the system to sanitize the internal tubing, fittings, pump, UV lamp unit and UF membrane. The filter cartridge assembly was isolated because the chemical oxidant used in the sanitization cycle is detrimental to the ion exchange resin in the filter cartridges.

The noise level of the system was measured to determine the actual reduced noise level resulting from the use of a variable speed motor. A Radio Shack™ sound level meter was used in determining the noise levels, which were measured at 0.5 and 1.0 meter from the front of the water treatment system in both recirculation (0.5 liters per minute) and at full production (1.5 liters per minute). At recirculation, the measured noise level from the system was 63.5 dB at 0.5 meter and 54.0 dB at 1.0 meter. At full production, which is equivalent to the motor speed and associated noise levels of conventional systems without variable speed motors, the measured noise level from the system was 68.0 dB at 0.5 meter and 64.0 dB at 1.0 meter. The background noise for each test was less than about 50 dB at both 0.5 and 1.0 meter.

This Example illustrates the effectiveness of the present system in providing pure water, substantially free of both organic and ionic contaminants, which can be accurately distributed as a desired product flow rate. In addition, the Example illustrates that water can be effectively and continuously purified in a recirculation mode at lower pump outputs (motor speed) resulting in substantially reduced noise levels.

Although particular embodiments of the invention have been described in detail for purposes of illustration, various modifications may be made without departing from the spirit and scope of the invention. For example, it is understood that system 10 can include additional or alternative water treatment devices such as dialysis units, continuous electrodeionization units, reverse osmosis units, other types of media filters, and the like. Moreover, the dosing control feature of the present invention can be applied to larger systems having higher flow rates in a wide variety of industrial applications such as in pharmaceuticals, electronics, food and beverage applications, chemical processing, wastewater and municipal water treatment, as well as analytical applications. Furthermore, a device which is to be supplied with ultrapure water can be fixedly connected, for example by means of a hose (not shown), to the outlet valve 30, or valve 48 (FIG. 5). A dispensing unit (not shown) may also be provided in system 10 to make accurate water dosing more convenient for the user. Another modification to system 10 contemplated by the present invention is the provision of a remote control of the input device 44 to control the motor M and/or valve 48, or providing an input device at various locations in the system, for example at a central switchboard. Accordingly, the invention is not to be limited except as by the appended claims.

What is claimed is:

1. A water treatment system having dosing control, comprising:
    a water inlet hydraulically connected to a pump having a variable speed motor and producing a pump output;
    at least one water treatment device hydraulically connected downstream of said pump;
    at least one outlet valve hydraulically connected downstream of said water treatment device; and
    a recirculation line hydraulically connected from said outlet valve to said pump,
    wherein said pump output is controlled by a regulating device connected to said variable speed motor;
    said regulating device including a controller and an input device to provide an input signal, which represents a desired flow rate at said outlet valve, to said controller; and
    said controller converting said input signal to a motor control signal that causes said variable speed motor to operate at a speed which causes the flow of water at said outlet valve to correspond to the desired flow rate.

2. The system of claim 1, wherein said at least one water treatment device is selected from the group consisting of an ultraviolet light lamp unit, a filter cartridge having at least one layer of an activated carbon and at least one layer of a mixture of ion exchange resins, an ultrafilter unit, and combinations thereof.

3. The system of claim 2, wherein said water treatment device is an ultraviolet light lamp unit.

4. The system of claim 2, wherein said water treatment device is a filter cartridge having at least one layer of an activated carbon and at least one layer of a mixture of ion exchange resins.

5. The system of claim 2, wherein said water treatment device is an ultrafilter unit.

6. The system of claim 2, further comprising a disinfection unit hydraulically connected between said pump and said outlet valve.

7. The system of claim 1, wherein said outlet valve is in a completely closed position during water recirculation in said system, and is in a completely opened position for removing purified water from said system.

8. The system of claim 7, wherein said pump has an output of about 0.5 liter/min for water recirculation in said system when said outlet valve is closed.

9. The system of claim 7, wherein said pump output is controlled by said regulating device when said outlet valve is opened.

10. The system of claim 1, wherein said input device includes a potentiometer.

11. The system of claim 1, wherein said input device includes a key pad.

12. The system of claim 1, wherein said input device includes an angle encoder.

13. The system of claim 1, wherein said regulating device is a potentiometer.

14. The system of claim 1, wherein said regulating device includes a device to perform at least one of turning off said motor at a first predetermined time, and turning on said motor at a second predetermined time.

15. The system of claim 14, wherein said first and second predetermined times are provided by a user through an input device.

16. The system of claim 14, wherein said first and second predetermined times are provided by said regulating device as a function of operational data.

17. The system of claim 1, further including a proportional valve hydraulically connected downstream of said outlet valve, wherein the regulating device is connected to said proportional valve.

18. The system of claim 17, wherein said controller converts said input signal to a valve control signal that causes said proportional valve to open at a cross-section which causes the flow of water at said proportional valve to correspond to the desired flow rate.

19. A water treatment system having dosing control to regulate a system output, comprising:
    a water inlet hydraulically connected to a pump having a variable speed motor and producing a pump output;
    at least one water treatment device hydraulically connected downstream of said pump;
    at least one outlet valve hydraulically connected downstream of said water treatment device;
    a recirculation line hydraulically connected from said outlet valve to said pump, wherein said pump output is controlled by a regulating device connected to said variable speed motor; and a proportional valve hydraulically connected downstream of said outlet valve, wherein the regulating device is connected to said proportional valve to control said system output;

said regulating device including a controller and an input device to provide an input signal, which represents a desired flow rate at said proportional valve, to said controller; and said controller converting said input signal to a valve control signal that causes said proportional valve to open at a cross-section which causes the flow of water at said proportional valve to correspond to the desired flow rate.

20. The system of claim 19, wherein said at least one water treatment device is selected from the group consisting of an ultraviolet light lamp unit, a filter cartridge having at least one layer of an activated carbon and at least one layer of a mixture of ion exchange resins, an ultrafilter unit, and combinations thereof.

21. The system of claim 20, wherein said water treatment device is an ultraviolet light lamp unit.

22. The system of claim 20, wherein said water treatment device is a filter cartridge having at least one layer of an activated carbon and at least one layer of a mixture of ion exchange resins.

23. The system of claim 20, wherein said water treatment device is an ultrafilter unit.

24. The system of claim 20, further comprising a disinfection unit hydraulically connected between said pump and said outlet valve.

25. The system of claim 19, wherein said outlet valve is in a completely closed position during water recirculation in said system, and is in a completely opened position for removing purified water from said system.

26. The system of claim 25, wherein said pump has an output of about 0.5 liter/min for water recirculation in said system when said outlet valve is closed.

27. The system of claim 25, wherein said pump output is controlled by said regulating device when said outlet valve is opened.

28. The system of claim 19, wherein said controller converts said input signal to a motor control signal that causes said motor to operate at a speed which causes the flow of water at said outlet valve to correspond to the desired flow rate.

29. The system of claim 28, wherein said input device includes a potentiometer.

30. The system of claim 28, wherein said input device includes a key pad.

31. The system of claim 28, wherein said input device includes an angle encoder.

32. The system of claim 19, wherein said regulating device is a potentiometer.

33. The system of claim 19, wherein said regulating device includes a device to perform at least one of turning off said motor at a first predetermined time, and turning on said motor at a second predetermined time.

34. The system of claim 33, wherein said first and second predetermined times are provided by a user through an input device.

35. The system of claim 33, wherein said first and second predetermined times are provided by said regulating device as a function of operational data.

36. A water treatment system having dosing control to regulate a system output, said water treatment system comprising:

a water inlet hydraulically connected to a pump;

at least one water treatment device hydraulically connected downstream of said pump;

at least one outlet valve hydraulically connected downstream of said water treatment device;

a recirculation line hydraulically connected from said outlet valve to said pump; and a proportional valve hydraulically connected downstream of said outlet valve, wherein said system output is controlled by a regulating device connected to said proportional valve;

said regulating device including a controller and an input device to provide an input signal, which represents a desired flow rate at said proportional valve, to said controller; and said controller converting said input signal to a valve control signal that causes said proportional valve to open at a cross-section which causes the flow of water at said proportional valve to correspond to the desired flow rate.

37. The system of claim 36, wherein said at least one water treatment device is selected from the group consisting of an ultraviolet light lamp unit, a filter cartridge having at least one layer of an activated carbon and at least one layer of a mixture of ion exchange resins, an ultrafilter unit, and combinations thereof.

38. The system of claim 36, wherein said outlet valve is in a completely closed position during water recirculation in said system, and is in a completely opened position for removing purified water from said system.

39. The system of claim 38, wherein said pump has an output of about 0.5 liter/min for water recirculation in said system when said outlet valve is closed.

* * * * *